United States Patent
Castellani et al.

[19]

[11] Patent Number: 6,018,126

[45] Date of Patent: Jan. 25, 2000

[54] FLUSH POKE-THROUGH WIRING FITTING

[75] Inventors: Norman Castellani, Park Ridge; John F. Bera, Kinnelon; John E. Kohaut, Port Murray, all of N.J.

[73] Assignee: Walker Systems, Inc., Williamstown, W. Va.

[21] Appl. No.: 09/098,797

[22] Filed: Jun. 17, 1998

Related U.S. Application Data

[63] Continuation of application No. 08/766,894, Dec. 13, 1996, abandoned, application No. 08/723,456, Oct. 7, 1996, abandoned, and application No. 08/850,408, May 2, 1997, abandoned.

[51] Int. Cl.⁷ ...................................................... H02G 3/04
[52] U.S. Cl. ................................ 174/48; 174/53; 52/220.8
[58] Field of Search ................................. 174/48, 49, 50, 174/51, 53, 54, 55; 220/3.3, 3.4, 3.5; 52/220.5, 220.7, 220.8; 439/535, 536

[56] References Cited

U.S. PATENT DOCUMENTS

| | | |
|---|---|---|
| 2,042,633 | 6/1936 | Richardson . |
| 3,359,359 | 12/1967 | Beck et al. . |
| 3,751,576 | 8/1973 | Klinkman et al. . |
| 3,932,696 | 1/1976 | Fork et al. ................................ 174/48 |
| 3,995,102 | 11/1976 | Kohaut . |
| 4,099,020 | 7/1978 | Kohaut . |
| 4,245,445 | 1/1981 | Heinen . |
| 4,270,318 | 6/1981 | Carroll et al. . |
| 4,272,643 | 6/1981 | Carroll et al. . |
| 4,364,210 | 12/1982 | Fleming et al. . |
| 4,443,654 | 4/1984 | Flachbarth et al. . |
| 4,467,577 | 8/1984 | Licht . |
| 4,477,694 | 10/1984 | Kohaut ..................................... 174/48 |
| 4,577,055 | 3/1986 | Wuertz ..................................... 174/48 |
| 4,612,412 | 9/1986 | Johnston ............................... 174/65 R |
| 4,767,181 | 8/1988 | McEowen . |
| 4,770,643 | 9/1988 | Castellani et al. .................... 174/48 X |
| 4,879,435 | 11/1989 | Domigan . |
| 4,993,970 | 2/1991 | Littrell ..................................... 439/535 |
| 5,114,365 | 5/1992 | Thompson et al. . |
| 5,195,288 | 3/1993 | Penczak . |
| 5,220,131 | 6/1993 | Wuertz . |
| 5,272,278 | 12/1993 | Wuertz ...................................... 174/48 |
| 5,305,380 | 4/1994 | Hileman et al. . |
| 5,350,884 | 9/1994 | Littrell . |
| 5,383,567 | 1/1995 | Sorathia et al. . |
| 5,393,930 | 2/1995 | Wuertz ..................................... 174/48 |
| 5,410,103 | 4/1995 | Wuertz . |
| 5,486,650 | 1/1996 | Yetter ....................................... 174/53 |
| 5,627,340 | 5/1997 | Smith et al. . |

FOREIGN PATENT DOCUMENTS

| | | |
|---|---|---|
| 56-159919 | 9/1981 | Japan . |
| 384 671 | 2/1965 | Switzerland . |

*Primary Examiner*—Dean A. Reichard
*Attorney, Agent, or Firm*—McAndrews, Held & Malloy, Ltd.

[57] ABSTRACT

The in-floor, flush poke-through wiring fitting may be installed in the floor of a structure to enable the activation of power, communication, and/or data services at the fitting location. The poke-through fitting includes an interference shielding barrier to prevent E.M. and R.F. interference with the signal services. The poke-through fitting also includes pre-shaped fire-retarding materials, which are encapsulated to prevent degradation and damage. The poke-through fitting accommodates RJ-45 Category 5 signal jacks such that the faces of the jacks (that is, the faces that may receive selectively, RJ-45 Category 5 connectors) are mounted substantially flush with an upper outwardly facing surface of the fitting.

1 Claim, 3 Drawing Sheets

FLUSH POKE-THROUGH WIRING FITTING

CROSS REFERENCE TO RELATED APPLICATIONS

This is a continuation of our U.S. co-pending patent application Ser. No. 08/766,894 filed Dec. 13, 1996; Ser. No. 08/723,456 filed Oct. 7, 1996; and Ser. No. 08/850,408 filed May 2, 1997. The entire disclosures in application Ser. Nos. 08/766,894; 08/723,456; and 08/850,408, are incorporated by reference herein.

STATEMENT REGARDING FEDERALLY SPONSORED RESEARCH OR DEVELOPMENT (NOT APPLICABLE)

BACKGROUND OF THE INVENTION

This invention relates generally to in-floor, flush poke-through wiring or service fittings for enabling activation of power, communication and/or data services at the in-floor locations of the fittings. More particularly, the present invention relates to flush poke-through wiring fittings that may be mounted in a larger diameter holes than previously thought possible while still satisfying fire code standards and that can support up to four RJ-45 Category 5 jacks internally so as to have the jacks' upper faces (that is, the faces which accept RJ-45 Category 5 connectors) substantially flush with the top surface of the poke-through fittings.

In the past, poke-through fittings were installed in an opening in a floor, such as a concrete slab or steel deck, in a building structure such as an office building. The floor opening had diameters of two inches or at the most three inches. The three inch floor opening size was thought, by those skilled in the art, to be a critical, maximum size limitation for enabling poke-through fittings to meet the stringent fire rating standards set by UL and other local governments.

Poke-through fittings were and are utilized to enable the activation of power, communication and/or data signal services at the poke-through fitting's location. As explained in U.S. Pat. No. 4,770,643, source power and signal cables, loosely positioned in a plenum, which is between the ceiling of the floor below and the floor above (that is, the floor in which the opening is in), may be pulled from the plenum and connected with or passed through the poke-through fitting for activation of services for and on the floor above. More specifically, high voltage source power cables have been connected with power receptacles, mounted in the poke-through fittings, to provide above-floor, in-floor outlets for, for example, power plugs for above-floor electrical and electronic equipment. Lower voltage service cables have been passed through the poke-through fitting to provide above floor connections between these cables and equipment positioned on the floor above.

In some instance, certain poke-through fittings have been able to accommodate relatively small data signal fittings, such as RJ-11 and RJ-45 fittings, internally. These relatively small signal fittings could not, however, be supported internally in the poke-through fittings so that their receptor faces (that is, the portions which are adopted to be connected with above floor signal transferring devices) were substantially flushed with the upwardly-facing portion of a flush poke-through fitting. Because of the previous perceived limitation on the size of the floor openings, the spacial relationships or proximity between the power receptacles and these relatively small data signal in poke-through fittings was necessarily close. The data signal fittings were subject to substantial interference, with respect to the signals being transferred, resulting from electromagnet ("E.M.") interference and radio frequency ("R.F.") interference from the power receptacle in the poke-through fittings. Such E.M. and R.F. interferences can be major factors in altering important signals. In the past, such poke-through internal fitting has not been provided with protection against such interferences. Additionally, poke-through fittings have not included substantial ground access for draining such E.M. and R.F. interferences.

In the past, no poke-through fitting has been able to accommodate internally the larger, improved, modular wired RJ-45 Category 5 jacks that are capable of transferring voice or data up to 100 megabits per second and that have become the standard for computer data transfer, particularly in connecting telecommunication devices to network systems. Similarly, these prior poke-through fittings have not been able to accommodate a variety of standard receptacles for power services, including isolated ground, surge suppressor, ground fault and receptacles that include a plurality of external pods for securing the receptacle face to the bottom cup.

In the past, fire retarding material, generally intumescent material, has been disposed in poke-through fittings for retarding the transmission of heat and flame from a fire in the plenum. Intumescent material may be activated upon exposure to a fire's heat and flames, rising through the floor opening from a fire below the floor. The intumescent material absorbs the heat and expands under pressure to form a flexible foam, which fills open spaces in the floor opening and hardens into a refractory char with increasing temperature. The fire retarding material functions to enable the fire rating of the floor to be substantially the same with or without the floor opening and fitting therein.

It is known that intumescent materials, which are a hydrated compound, tend over time to age (that is, to become hardened by absorbing moisture or water). Poke-through fittings are frequently used in new buildings having concrete floors, and thus the moisture in the new concrete is a ready source of moisture for absorption by the intumescent material.

In the past, fire-retardant intumescent material have been made and stored in flat sheets, and the sheets have been cut into desired shapes for fitting in poke-through fittings. These sheets were sandwiched between top and bottom layers of protective materials, but the cut, side edges of the intumescent material remain exposed since they are not covered by the protective layers. This exposure facilitated the degradation rate of the intumescent material. As noted, high humidity environments—such as in new construction environments where a curing concrete slab floor will experience extensive evaporation—accelerates the aging process of the intumescent material.

In the past, skilled persons working in the art also recognized that just including more and more layers of intumescent material in a poke-through fitting would not enable poke-through fittings to be used in a larger diameter floor openings. Intumescent material acts as a heat insulator. Thus while the lower layers of the intumescent material (that is, the layers closest to a plenum fire) might expand and char as normal, the upper layers would not fully expand and char because of the insulting effects of the lower layers. Additionally, including more intumescent materials in a poke-through fitting tended to cause "pop up" the fitting to poke-through, making the fitting stick up above surface of the floor above. Such "popped up" or "stuck-up" poke-through fittings posed hazards to the fire fighters and fire hoses on the floor above.

BRIEF SUMMARY OF THE INVENTION

The improved flush poke-through fittings of this invention overcome the above problems and additionally, provide commercially significant advantages as compared with the prior poke-through fittings. The invention comprises an improved, flush poke-through fitting for enabling the activation of power, communication, an/or data signal services at the poke-through fitting's location; for transferring voice or data signals through at least four of RJ-45 Category 5 signal jacks, which are supported internally so that the jack faces are substantially flush with the outwardly-facing portion of the service fitting; for preventing E.M. and R.F. interferences with such voice or data signal services; for accommodating internally a variety of RJ-45 Category 5 signal jacks, which are made by various manufacturers; for permitting the use of closures to cover unused RJ-45 Category 5 signal jacks without disturbing the jacks or the source signal cabling; and for accommodating a variety of larger, standard power receptacles. The improved poke-through fitting may be positioned in a large (up to four inches) diameter floor opening, while still satisfying the applicable fire rating standards, employing fire retarding, intumescent material that is pre-shaped, as by molding, and completely encapsulated in a composition for sealing all side edges and sides of the intumescent material so as to retard the aging and degradation of the intumescent material and so as to assure that the intumescent material will always expand to its volumetric capability.

The improved poke-through fitting of the present invention also includes a novel barrier for shielding the RJ-45 Category 5 signal jacks at the points of potential breakdown of wiring shielding, (that is, were the source signal cable enters and is secured to the jacks) so as to prevent E.M. and R.F. interferences. The barrier is also adapted to provide grounding so as to drain any E.M. and R.F. interferences, which may be generated, from the poke-through fitting. Further, the barrier has the additional advantage of assisting in dissipating heat by serving as part of a thermal path for conducting heat from the plenum to the poke-through fitting's carpet plate flange so that the flange can then give off the heat as radiation. This reduces plenum temperatures.

By accommodating up to four RJ-45 Category 5 signal jacks, the improved poke-through fitting of the present invention permits wire termination of the source signal cable internal to the fitting, with wire termination connection being rated gas and moisture proof pursuant to industry standards. The improved poke-through fitting further permits RJ-45 Category 5 jacks, made by the variety of manufacturers of such jacks, to be supported internally within the poke-through fitting so that their upper faces (that is, the faces which accepted RJ-45 Category 5 connectors) are flush with the upper, outerwardly-facing surface of the fitting adjacent to the carpet plate. By thus supporting the signal jacks, the faces of the signal jacks can be selectively protected by sliding closure plates without disturbing them or the source signal cable.

The improved poke-through fitting of the present invention also permits a wide variety of standard power receptacles to be supported internally for power services. These power receptacles include isolated ground, surge suppressor ground faults and external pod—secured receptacles. This makes the improved poke-through fitting more versatile, and hence more commercially attractive.

The employment of shaped encapsulated intumescent fire retarding material protects the material against damage from high humidity and moisture, as from evaporation from curing concrete. This thus retards aging and degradation of the material.

DETAILED DESCRIPTION OF THE PREFERRED EMBODIMENT OF THE INVENTION

Figure 1:
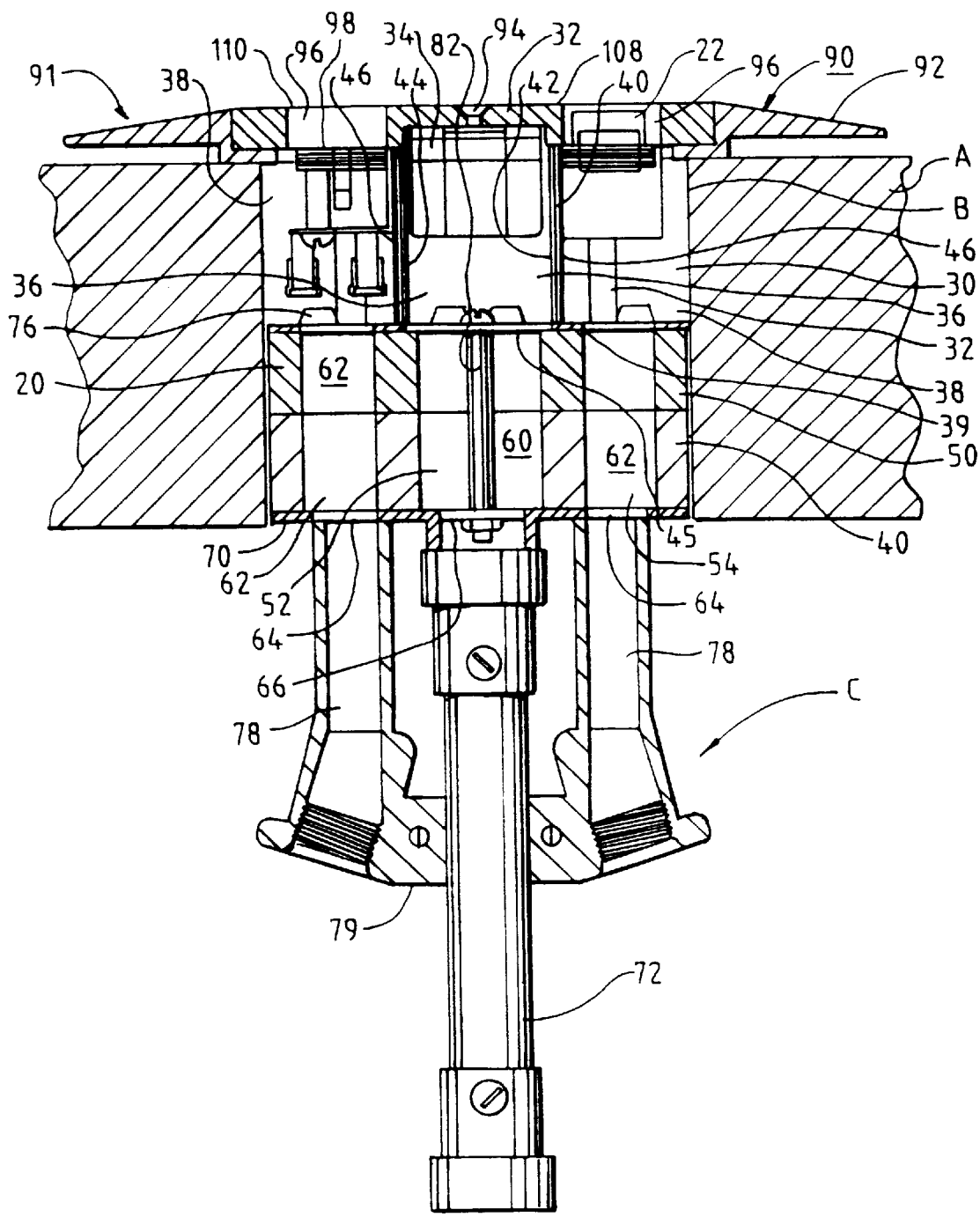
FIG. 1 is an elevational, partial-cross-sectional view of the improved poke-through fitting of the present invention, shown installed in a floor opening.
Figure 2:
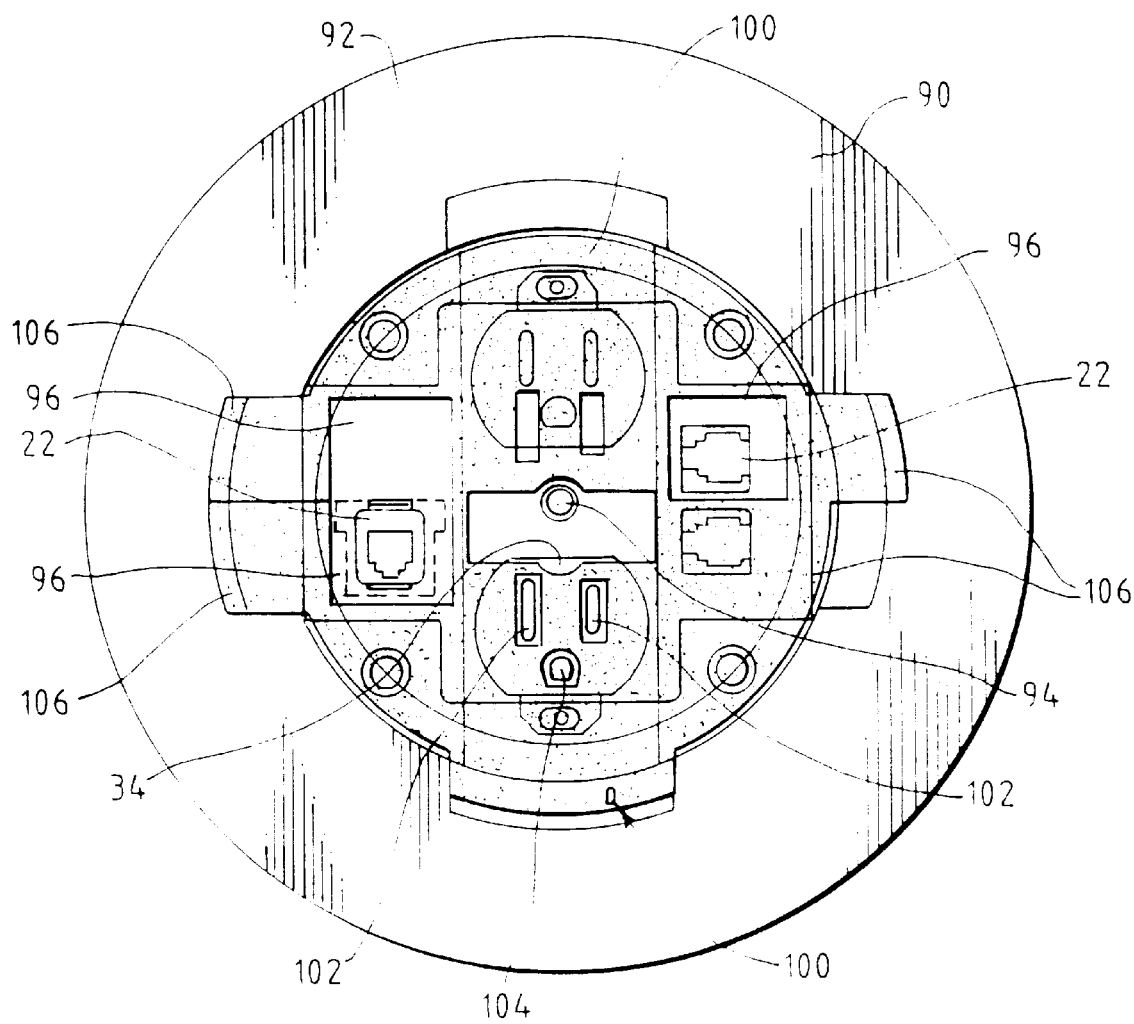
FIG. 2 is a top plan view of the improved poke-through fitting of FIG. 1.
Figure 3:
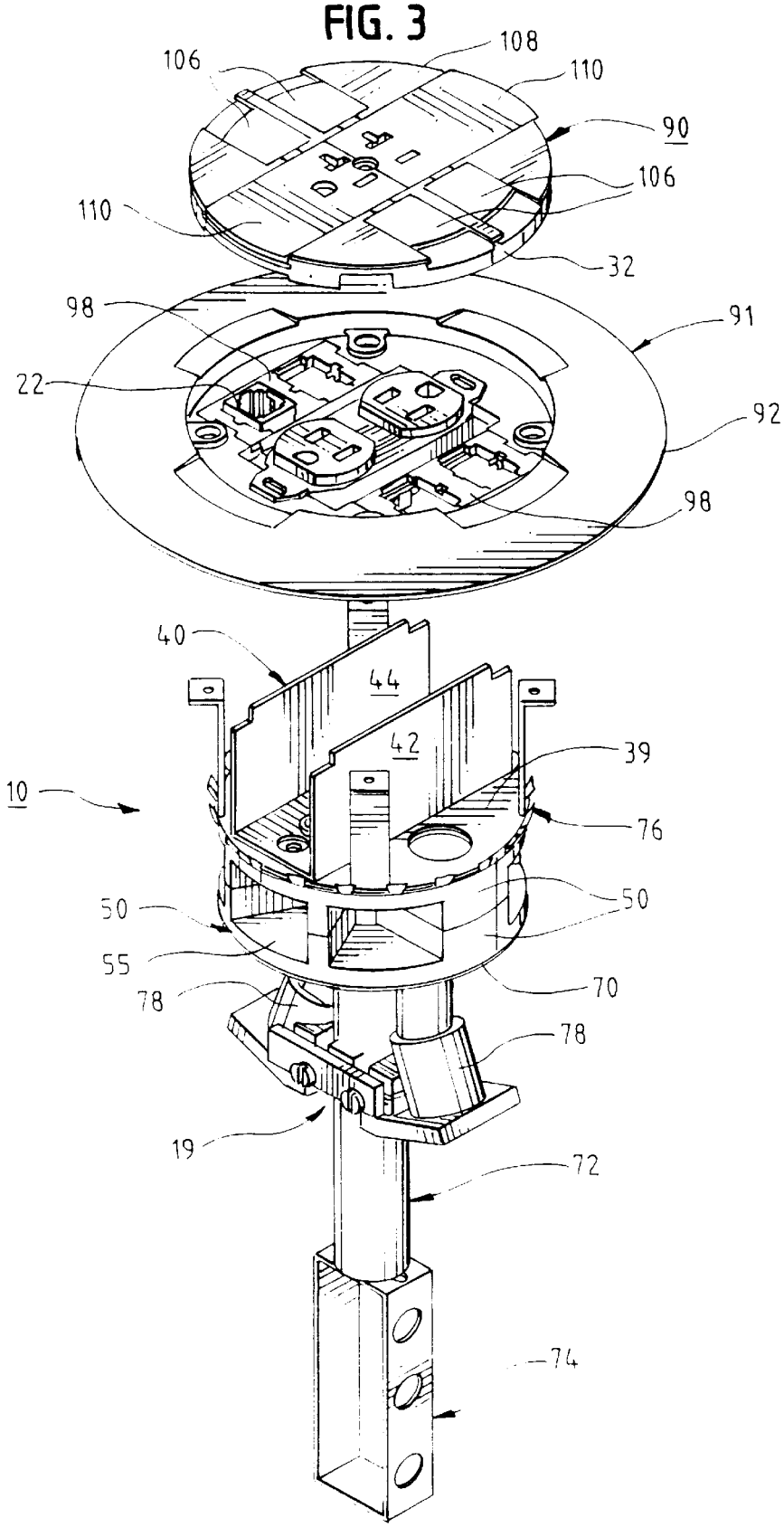
FIG. 3 is a partially exploded, perspective view of the improved poke-through fitting of FIG. 1.

The present invention comprises an improved flush poke-through wiring or service fitting 10 as shown in FIGS. 1–3. The poke-through fitting 10 is adapted to be connected to and to be activated by source signal service cables, including source communication and/or data signal cables (not shown) and by power source service cables (not shown). The source signal cables are capable of transferring signals consisting of communication (voice) or data signals.

The poke-through fitting 10 is adapted to be installed in a fire-rated floor A of a building, such as a commercial office building. More specifically, the poke-through fitting 10 may be installed in a circular opening B formed in floor A to activate a desired floor location. It is adapted to be activated by connecting source power service and signal service cables, which are otherwise disposed in the plenum C below the floor A, to fittings, for instance, power receptacles and signal jacks, respectively, mounted internally in the poke-through fitting 10. This enables above-floor A power plugs and signal transferring devices to be connected the poke-through fitting 10 and to thus transfer power and communication and/or data signals to equipment located on or above the floor A.

The poke-through fitting 10 is also adapted to retard the transmission of heat and flame from the plenum C below floor A, through floor opening B and the poke-through fitting 10, to the floor A. It functions such that the fire rating of floor A is substantially the same as when there is no opening B in the floor A or as when the poke-through fitting 10 is supported in the floor opening B.

The poke-through fitting 10 includes a novel barrier adapted to separate the source power service cables from the source signal cables as they are connected with their respective fittings in the poke-through fitting so as to shield the signal services from E.M. and/or R.F. interferences. In addition, the E.M. and R.F. interferences shielding barrier is adapted to facilitate the dissipation of heat from the plenum, through the poke-through fitting 10, when there is no fire in the plenum.

The poke-through fitting 10 accommodates and supports a plurality of RJ-45 Category 5 signal jacks such that there upper faces are substantially flush with the upper surface of the portion of the fitting 10 overlying the floor A. The poke-through fitting 10 includes novel pre-shaped intumescent fire retarding material that is totally encapsulated to protect the intumescent material against damaging hardening resulting from exposure to high humidity and moisture and to retard premature aging and degradation of the material.

Referring now to FIGS. 1–3, the poke-through fitting 10 comprises an insert 20 that is adapted to be installed in the floor opening B. The insert 20 has several signal jacks or fittings 22 that are each adapted to be activated by source signal service cables (not shown) and to enable conventional signal transferring connectors (not shown) to be selectively connected to the jacks 22. Preferably the jacks 22 are RC-45 Category 5 signal jacks.

Insert 20 includes an upper, generally cylindrical chamber 30, which is defined at the insert's upper end by a horizontally disposed top plate 32, for enclosing and mounting a power receptacle 34 and the signal jacks 22. The power receptacle 34 is adapted to be connected with the "upper ends" of source power service cables (not shown) for activation of power service in conventional manner. As hereinafter described and as shown in FIG. 1, the upper chamber 30 is divided into a central space or portion 36, in which the power receptacle 34 is disposed, and a radially outer, semi-annular or side spaces or portions 38 in which the signal jacks 22 are disposed. As noted above, the source power service cables and the source signal service cables are usually disposed below floor A in the plenum C until they are connected with the poke-through fitting 10 for activation of the services above the floor A.

The chamber 30 may have a nominal diameter of four inches. This is much larger (four inches vs. three inches) than inserts of prior poke-through fittings. The radial internal space and volume of the chamber 30 is thus substantially larger than the internal space available in prior poke-through fittings that have nominal diameters of up to three inches. This increased internal space of the chamber 30 enables any one of a plurality of types of power receptacles and signal jacks to be mounted and supported in the insert 20. More specifically, the central space 36 is adapted to accommodate most standard 15 and 20 amp power receptacles, including isolated ground, surge suppressor, ground fault, and receptacles including external pods for securing the receptacle face to a bottom cup. The two side spaces 38 are adapted to accommodate a plurality of signal jacks, such as up to four RJ-45 Category 5 jacks.

Insert 20 includes a novel E.M. and/or R.F. interferences barrier 40 mounted in the upper chamber 30. The barrier 40 separates and electrically isolates the source power service cables from the source signal service cables in the chamber 30 so as to shield the source signal service cables, and their associated jacks 22, from E.M. and/or R.F. interferences enumerating from the source power service cables. The barrier 40 is positioned in insert 20 so as to extend, vertically in the chamber, from the top plate 32 to a horizontally disposed middle plate 39 and to extend, horizontally, across the entire chamber 30. More specifically and as shown in FIGS. 1 and 3, the barrier 40 comprises a pair of plates 42 and 44 that are disposed, side by side, in a generally parallel manner, adjacent to the sides of the power receptacle 34. These plates extend across the chamber 30 like chords and serve to divide the center space 36 from the side spaces 38. The barrier 40 may also include a conventional E.M. interference barrier and conventional R.F. interference barrier, as indicated at 46 in FIG. 1, on the one side surfaces of plates 42 and 44. The barrier 40 shields the radially outer spaces 38, where the source signal services cables are connected to the signal jacks 22, from the central space 36, where the power source service cable is connected to the receptacle 34.

The barrier 40 is comprised of a material having a dielectric sufficient to isolate the end of the source power service cable from the ends of the source signal service cables. This material may comprise a polycarbonate polymer. The barrier 40 may be grounded to drain E.M. and R.F. interferences, which may be generated in insert 20, with respect to the chamber 30. More particularly and as shown in FIG. 1, the barrier 40 is electrically connected, via a rivet 82, to a horizontally disposed bottom plate 70, which is grounded as explained below.

Insert 20 further includes two novel fire retarding elements 50, comprised intumescent material such as hydrated sodium silicate. More specifically, the intumescent material may comprise coated rubber intumescent material, such as a proprietary material sold under the mark FB-525 by Alva-Tech, Inc., Asbury park, N.J., of the type described in U.S. Pat. No. 4,588,523. The FB-525 material absorbs heat and begins to expand upon exposure to heat and flame. Expansion is substantial at a relatively low temperature of 250° F. It expands to about 1.5 times its initial volume or density at 250° F. The resultant flexible foam rapidly seals any existing openings. The intumescent material may be molded in the desired shape and totally encapsulated in a composition such as polyvinylchloride.

The intumescent material may preferably comprise graphite intumescent material in a urethane matrix, molded to be pre-shaped in a generally tubular shape and totally encapsulated in a composition such as polypropylene so as to seal each element 50 and render it substantially degradation-free, and to insure expansion of each element 50 to substantially the maximum required to seal opening B. The graphite intumescent material in a urethane matrix may comprise a non-halogen proprietary material sold under the mark FB65NH by Alva-Tech, Inc., Ashbury Park, N.J. It also absorbs heat and begins to expand upon exposure to heat and flame. Expansion starts at about 400° F., with significant expansion after about 500° F., and continuing until about 1000° F. It expands to about 8 to 20 times its initial volume or density. It forms a dense insulative char when activated. The graphite intumescent material can be compacted and it can be custom molded in the desired shape.

Each of the molded fire retarding elements 50 includes internal spaces 52 and 54 and several external, radially outwardly facing spaces 55 molded in them which spaces enables substantially complete expansion of the intumescent material to take place. The internal spaces 52 and 54 molded in the elements 50 are substantially larger than the internal spaces in prior fire retardant material. The elements 50 forms in insulating barrier to control temperature increases and retard the spread of flames. The elements 50 further protect against heat and flame by forming a refractory char as the temperature continues to rise.

More particularly, the fire retarding elements 50 each include a central, hollow space 52 that defines and forms a central raceway 60 through which the source power service cables are extendable. The elements 50 similarly include two side hollow spaces 54 that define and form two side raceways 62 through which the source signal service cables are extendable.

As noted before the insert 20 includes a bottom plate 70. The fire retarding elements 50 are supported between the middle plate 39 and the bottom plate. The bottom plate 70 may be a casting, and have openings 64 and 66 which are aligned with the raceways 62 and 60, respectively, in the elements 50.

The upper end of a conventional electrical metalized tubing (EMT) connector 72 may be connected to the plate 70 for securing a conduit system thereto and for improving grounding capability. A conventional junction box (shown at 74 in FIG. 3) may be connected to the lower end of the connector 72. The junction box 74 may include a terminal (not shown) for connection of the source power service cable(s) in the plenum C to the box. When a junction box 74 is utilized with the fitting 10, the poke-through fitting 10 may be pre-wired by wires (not shown) which are connected between the terminals of the power receptacle 34 and terminals in the junction box 74 and which extend through the EMF connector 72 and the raceway 60. Thus, activation of the poke-through fitting 10 occurs when source power cables are connected to the receptacle 34 either directly or indirectly via a pre-wire junction box 74.

Insert 20 also includes a conventional annular retainer 76 which is disposed adjacent the middle plate 39. The retainer 76 retains the poke-through fitting 10 in floor opening B. As stated above, at least one rivet 82 extends between and is connected between the plates 39 and 70 for assisting in securing the fire retarding elements SO between the plates, and as noted, to facilitate grounding of the barrier 40.

Insert 20 may also include signal tubes 78 for passing source signal service cables therethrough. The signal tubes 78 are comprised of a dielectric material and may be supported on the connector 72 by a conventional clamping assembly shown generally at 79 in FIGS. 1–3.

As stated above, the fire retarding elements 50 are comprised of an intumescent material, which is a dielectric. Tubes 78 are also made of a dielectric material, which may comprise butyrate or polyethylene. The butyrate of which signal tubes 78 are preferably comprised has a dielectric of about 300–475 volts per mil, and the tubes 78 are about 15 mils thick. The dielectric of the fire retarding, intumescent material may be about 500–600 volts per mil, and such material may be about 250 mils thick. The dielectric of the signal tube material and of the fire retarding, intumescent material are substantially the same as the dielectric of about 10,000 volts for electrical safety for the poke-through fitting 10.

The poke-through fitting 10 further includes a top assembly 90 shown in FIGS. 1–3. The top assembly 90 comprises a service head 91 including a carpet flange plate 92, which is preferably made of aluminum, and a slider subassembly 93. The subassembly 93 is connectable to the top assembly 90 by a screw 94. The top assembly 90 further includes signal jack openings 96, and a data connector or jack mounting plates 98. The plates 98 are designed so that they can support jacks (and particularly, RJ-45 Category 5 jacks) made by different manufacturers.

The slider subassembly 93 includes a first pair of sliders 100. Slots 102 and 104 in the sliders 100 are alignable with corresponding receptacle receiving slots in the power receptacle 34. The sliders 100 are slidably movable between positions covering and uncovering the receptacle slots in the receptacle 34. The subassembly 91 also has four jack sliders 106. These sliders 106 are slidably movable between positions covering and uncovering insert signal jack openings 96.

Top assembly 90 and subassembly 91 further include a smooth top surface 108. As best seen in FIG. 1, the top faces 110 of the signal jacks 22 are adapted to extend substantially flush with this top surface 108.

As illustrated in FIG. 1, the periphery of the carpet flange plate 92 is adapted to extend above the plane of the floor A. Hence, the top assembly's top surface 108 can extend substantially flush with the top of a carpet (not shown) that may be installed on floor A.

To install the poke-through fitting 10 in floor A at a desired location for service activation, the floor A is drilled at the desired location, as by core drilling, to form a round floor opening B, preferably having a four inch diameter. The opening B is needed to gain access to the power, communication and/or data signal source service cables in the plenum C. The source power and/or signal service cables may be pulled from the plenum C and through the opening B for connection to the poke-through fitting 10 above the floor A. When the poke-through fitting 10 includes a junction box and is pre-wired, the source power service cables may be pulled and connected to terminals and wires in the junction box to thereby activate the power services. As a practical matter, whether the source power service cables are connected with the power receptacle 34 directly, or indirectly through a pre-wired junction box 74, the E.M. and R.F. interferences may still be present in the central space 36.

The source signal service cables may similarly be pulled from the plenum C, through the opening B, through the tubes 78 and the raceways 62 into the insert 20 for connection to signal jacks 22 in the upper chamber 30 for activation of communication or data services. Preferably the signal jacks 22 and the mounting plates are removed from fitting 10, the source signal cables are pulled through the openings that are left and the ends of the cables are connected with the jacks. The jacks 22 and plates 98, along with the cables are then put back into the fitting 10. A signal connector, such as an RJ-45 Category 5 connector, may be connected to signal jacks 22, to activate signal-operable equipment.

The insert 20, and the junction box 74 connected thereto, may then be pushed into the floor opening B until top assembly 90 rests on floor A such that the top surface 108 of top assembly 90 is substantially flush with the top of a carpet. The retainer 76 will grip the periphery floor opening B to resist the poke-through fitting from being pulled upwardly out from the floor opening B.

In operation, fire retarding elements 50 will be activated by a fire below floor A and upon exposure to heat and flame from the fire rising through floor opening B. As noted, the fire retarding elements 50 are preferably comprised of intumescent material and will be activated, if a fire occurs in the plenum C, to expand, under pressure, into the floor opening B, about insert 20 and about the source power and signal service cables extending through raceways 60 and 62. The intumescent material thus, will form flexible foam seals that seal the openings B and that form very strong refractory chars. Specifically, the intumescent material will seal the openings B to form an efficient heat and smoke barrier and to retard transmission of heat and flame from the fire through the opening B. This enables the fire rating of floor A to be substantially the same with or without floor opening B and poke-through fitting 10 therein. As discussed above, the total encapsulation of the intumescent material prevents the material from aging or degrading and thus assures that the poke-through fitting 10 will fulfill its fire retarding function even though the fitting 10 is disposed in a selectively large, four inch diameter opening B.

In use, sliders 100 in top assembly 90 may be moved so that outlet slots 102 and 104 in sliders 100 align with corresponding outlets slots in the power receptacle 34. Connectors, for example plugs (not shown) from electrical and/or electronic devices, may be plugged into the receptacle outlets for activation of above floor A power services.

Sliders 106 in top assembly 90 may be moved so that the signal jack openings 96 in top assembly 90, and thus, the jacks 22, are exposed. Signal connectors, such as an RJ-45 Category 5 connectors, may be connected to jacks 22 for activation of above-floor A signal services.

The barrier 40 shields the connection between the source signal service cables and the jacks 22 from interference, with the signal thereof, as from E.M. and/or R.F. interferences. The barrier 40 is designed and adapted to shield at the points of principal potential breakdown of the normal cable shielding, such as where such cables enter the upper chamber 30 of the insert 20 and are connected to jacks 22.

The barrier 40 is also grounded to drain the interferences, which may be generated, from the insert 20. The barrier further conducts heat (temperatures) from within the insert 20 and plenum C to the flange plate 92 of top assembly 90. The flange plate 92 can then radiate and dissipate the heat.

As noted, the upper chamber 30 in the insert 20 is substantially larger than the internal chamber therefor in prior poke-through fittings. Thus chamber 30 is thus able and adapted to accommodate any one of a plurality of types of receptacles 34 and jacks 22. More specifically, internal side spaces 38 for the signal jacks 22 are adapted to accommodate up to four RJ-45 Category 5 signal jacks 22 for accepting source signal service cables from the plenum C. Such signal jacks 22 include terminals (not shown) adapted to be rated gas and moisture proof. The jacks 22 are mounted so that their top faces 110 are substantially flush with the top surface 108 of top assembly 90.

As also noted above, the bottom plate 70 of insert 20 may comprise a casting and may be connected with the electrical metalized tubing connector 78. This improves the grounding capability. The openings 64 in the plate 70, leading to the raceways 62, may be tapped to accept standard conduit fittings when required.

A preferred embodiment of our invention has been described above, for the purpose of explaining the invention. However, it is to be understood that variations in such embodiment may be made which are nevertheless within the scope and spirit of the invention as set forth in the claims.

We claim:

1. In a flush poke-through wiring fitting that is adapted to be supported in a floor opening in a floor of a building structure; that includes an insert having a chamber defined therein; that has a fire retarding material disposed in the insert so that the fire rating of the floor, with the floor opening formed in the floor and with the poke-through wiring fitting supported in the floor opening, is substantially the same as the fire rating of the floor without the floor opening formed in the floor; that is adapted to have a source power service cable and a source signal service cable connected with the poke-through wiring fitting, which source power and source signal service cables may be disposed in a plenum below the floor before the floor opening is formed; that has a power receptacle mounted in the chamber so as to be adapted to be connected with the source power service cable and so as to be adapted to have an above floor power connector selectively connected therewith: and that has at least one signal jack mounted in the chamber so as to be adapted to be connected with the source signal service cable and so as to be adapted to have an above floor signal connector selectively connected therewith, the improvement comprising:

the insert having an upper end adjacent to the floor and a lower end adjacent to the plenum, having the chamber disposed adjacent to the upper end, and having a second portion disposed adjacent to lower end so that the source power and signal service cables pass therethrough, with the second portion having a predetermined volume and shape;

the fire retarding material being an intumescent material which is pre-shaped to fit within the predetermined shape and volume of the second portion of the insert and to define raceways therein for the receiving the source power and signal service cables, respectively, with the fire retarding material being encapsulated by an encapsulating composition that comprises polyvinyl chloride to protect the material against damage from high humidity and moisture and to retard premature aging and degradation.

* * * * *